United States Patent
Diehr et al.

(10) Patent No.: US 10,642,277 B2
(45) Date of Patent: May 5, 2020

(54) CLEANING STATION FOR MOBILE ROBOTS

(71) Applicant: Fetch Robotics, Inc., San Jose, CA (US)

(72) Inventors: Eric Peter Diehr, San Jose, CA (US); Michael Ferguson, San Jose, CA (US); Derek King, San Jose, CA (US)

(73) Assignee: FETCH ROBOTICS, INC., San Jose, CA (US)

( * ) Notice: Subject to any disclaimer, the term of this patent is extended or adjusted under 35 U.S.C. 154(b) by 241 days.

(21) Appl. No.: 15/466,804

(22) Filed: Mar. 22, 2017

(65) Prior Publication Data

US 2018/0275668 A1  Sep. 27, 2018

(51) Int. Cl.
| | |
|---|---|
| *G06F 19/00* | (2018.01) |
| *G05D 1/02* | (2020.01) |
| *B08B 1/00* | (2006.01) |
| *B08B 1/04* | (2006.01) |
| *B08B 3/02* | (2006.01) |
| *B08B 5/02* | (2006.01) |
| *B08B 7/02* | (2006.01) |
| *G02B 27/00* | (2006.01) |
| *B60L 3/00* | (2019.01) |
| *B08B 1/02* | (2006.01) |
| *B60L 53/37* | (2019.01) |
| *B60L 53/14* | (2019.01) |
| *B60L 53/12* | (2019.01) |

(52) U.S. Cl.
CPC .......... *G05D 1/0225* (2013.01); *B08B 1/002* (2013.01); *B08B 1/005* (2013.01); *B08B 1/02* (2013.01); *B08B 1/04* (2013.01); *B08B 3/02* (2013.01); *B08B 5/02* (2013.01); *B08B 7/028* (2013.01); *B60L 3/0038* (2013.01); *B60L 53/37* (2019.02); *G02B 27/0006* (2013.01); *G05D 1/024* (2013.01); *B60L 53/12* (2019.02); *B60L 53/14* (2019.02); *G05D 2201/0216* (2013.01)

(58) Field of Classification Search
CPC ........ G05D 1/0225; B08B 7/028; B08B 5/02; B08B 3/02; B08B 1/04; B08B 1/006; B08B 1/002; B08B 3/08
See application file for complete search history.

(56) References Cited

U.S. PATENT DOCUMENTS

| | | | |
|---|---|---|---|
| 2011/0220160 A1* | 9/2011 | Bosma | A01J 7/022 134/56 R |
| 2015/0148951 A1* | 5/2015 | Jeon | G05D 1/0219 700/248 |

(Continued)

*Primary Examiner* — Ian Jen
(74) *Attorney, Agent, or Firm* — Fenwick and West LLP

(57) ABSTRACT

A station uses cleaning mechanisms to clean sensors of mobile robots. The mobile robots may use data from the sensors to navigate around an environment such as an inventory warehouse. A sensor of a mobile robot can become dirty over time as dust or other debris accumulates on the sensor. Since the mobile robots can navigate to a station for automatic sensor cleaning, a human does not need to manually clean the sensors. Multiple mobile robots may share one or more stations in the environment and coordinate a schedule to have their sensors cleaned. The stations may also charge a battery of a mobile robot simultaneously while cleaning the mobile robot's sensors.

17 Claims, 11 Drawing Sheets

(56) References Cited

U.S. PATENT DOCUMENTS

| | | | |
|---|---|---|---|
| 2015/0198952 A1* | 7/2015 | Einecke | G05D 1/0225 |
| | | | 134/6 |
| 2016/0144505 A1* | 5/2016 | Fong | B25J 9/1697 |
| | | | 700/250 |
| 2016/0144511 A1* | 5/2016 | Romanov | B25J 9/1697 |
| | | | 701/28 |
| 2016/0147230 A1* | 5/2016 | Munich | G05D 1/0246 |
| | | | 701/28 |

* cited by examiner

500

Determine that a mobile robot is located at a cleaning station.
510

Clean a sensor of the mobile robot.
520

Charge a battery of the mobile robot simultaneously while cleaning the sensor.
530

Determine that the sensor is cleaned.
540

Determine that the mobile robot is no longer located at the cleaning station.
550

CLEANING STATION FOR MOBILE ROBOTS

FIELD OF ART

This description generally relates to sensor-equipped mobile robots and mechanisms for cleaning sensors of the mobile robots.

BACKGROUND

Mobile robots can be used in inventory warehouses to assist humans to complete order fulfillment services. For example, the mobile robots transport inventory items from shelves to a checkout or shipping location. The mobile robots may operate under human control or navigate autonomously based on known map information or sensor data generated by sensors of the mobile robots. For example, a sensor is a camera that captures images of the surroundings of a mobile robot. The mobile robot uses the captured images to detect and navigate around obstacles in its environment.

However, the sensor may become dirty as dust and debris accumulate on the sensor over time. When the sensor is dirty, the sensor may generate inaccurate data, which results in unreliable navigation. It is tedious for a human to manually clean the sensor. Additionally, in a large-scale system such as an inventory warehouse with many mobile robots for transporting inventory items, it can be especially labor-intensive and impractical to manually clean the sensors of each mobile robot.

SUMMARY

Systems and methods are disclosed to clean sensors of mobile robots using stations including cleaning mechanisms (or "cleaners"). A mobile robot uses sensors such as a laser sensor or a camera to capture data describing the surrounding environment of the mobile robot. The data can be used for generating a map of the environment and helping the mobile robot navigate in the environment. As an example use case, an inventory warehouse environment includes multiple mobile robots and stations. The mobile robots navigate around the warehouse to transport inventory items and may assist humans to complete order fulfillment services. A mobile robot navigates to a station to have its sensors cleaned and/or to charge its battery. To reduce the idle time of mobile robots, stations can simultaneously perform sensor cleaning and battery charging.

A mobile robot may navigate to a station for sensor cleaning based on one or more different parameters. For instance, the mobile robot determines that its sensors have not been cleaned for a given duration of time or that it has a scheduled time for sensor cleaning. The mobile robot may navigate to the station in response to determining that a quality level of its sensor data is below a threshold value, which is indicative of a dirty sensor. Further, the mobile robot may decide to navigate to the station when the mobile robot currently does not have any other command to perform. After the sensor cleaning is complete, the mobile robot may navigate away from the station so that another mobile robot can also use the same station for sensor cleaning or battery charging.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 5 is a flowchart of an exemplary process for cleaning a sensor of a mobile robot, according to one embodiment.

DETAILED DESCRIPTION

The Figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

I. Functionality of Stations

Figure 1A:
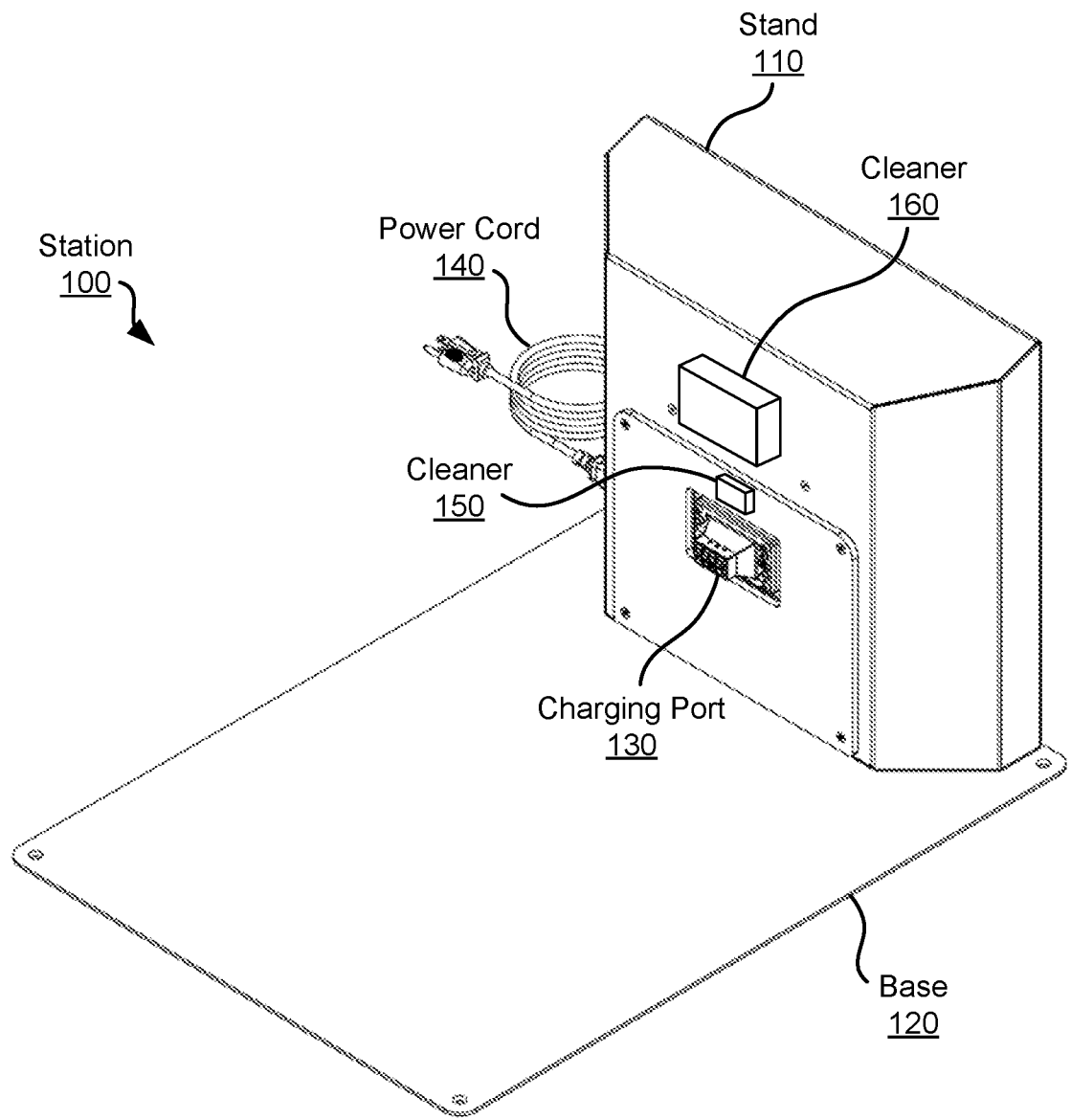
FIG. 1A is an isometric view of a station with cleaning mechanisms, according to one embodiment.

FIG. 1A is an isometric view of a station 100 with cleaning mechanisms, according to one embodiment. The station 100 includes a stand 110 coupled to a base 120. The base 120 is parallel to the ground and may be secured to the ground such that the station 100 maintains a stable and stationary position. For example, the station 100 does not shift in position if a mobile robot physically contacts the station 100. The stand 110 includes a charging port 130, a power cord 140, a first cleaner 150, and a second cleaner 160.

The station 100 can charge a battery of a mobile robot electrically coupled to the charging port 130. In one example, the station 100 draws power for charging via the power cord 140 from a mains electricity alternating current (AC) source. The mains electricity source may be at 110 volts, 120 volts, 220 volts, 230 volts, or any other suitable voltage. The station 100 may include power electronics to down-convert the mains electricity source to lower voltage for charging mobile robots. The station 100 may include sensors to determine the level of charge of a battery of the mobile robot. Based on the determined level of charge, the station 100 can determine whether to start or stop charging. The charging port 130 may have a limited range of motion in one or more axis, which can help facilitate alignment with a mobile robot approaching the station 100 for charging. In other embodiments, the station 100 includes a wireless charger instead of (or in addition to) a charging port 130. For example, the station 100 uses inductive charging to charge the mobile robot's battery when the mobile robot is located within a threshold distance from the station 100. In some embodiments, the station 100 includes one or more charging contacts instead of (or in addition to) a charging port 130. The station 100 charges the mobile robot's battery when corresponding charging contact(s) of the mobile robot contact the one or more charging contacts.

The station 100 cleans sensors of a mobile robot using the first cleaner 150 and/or the second cleaner 160. The station 100 can clean the sensors of the mobile robot while simultaneously charging a battery of the mobile robot. Alternatively, the station 100 may clean the sensors of the mobile robot before or after charging a battery of the mobile robot. In one example, the station 100 partially charges the battery the mobile robot (for example, at a first charging rate), cleans the sensors, and charges the battery again (for example, at a second charging rate slower than the first charging rate). The cleaners 150 and 160 may include one or more different types of cleaners such as a mechanical wiper, a liquid dispenser, a fan, an ultrasonic cleaner, and a compressed air tank, among other suitable cleaning mechanisms.

A mechanical wiper includes an appendage (a "wiper") that is actuated using a motor or pneumatic cylinder, in one embodiment. The wiper cleans a sensor of a mobile robot by physically contacting and wiping the sensor to remove dust or debris. The wiper may include a sponge or absorbent type material that is damped by a cleaning solvent. The mechanical wiper may be a rotating brush actuated using a motor. In some embodiments, the mechanical wipe is not coupled to an actuator. For example, the mechanical wipe is a static brush that cleans a sensor as a mobile robot moves back-and-forth across the brush.

A liquid dispenser includes a nozzle that dispenses a cleaning solvent to clean a sensor of a mobile robot, in one embodiment. The nozzle can dispense the cleaning solvent as a mist or as any number of liquid streams directed toward the sensor. The liquid dispenser also includes a pump for dispensing the cleaning solvent through the nozzle. The cleaning solvent may be water or include one or more different types of cleaning chemicals.

A fan blows air toward a sensor of a mobile robot to remove dust or debris from the sensor, in one embodiment. Similarly, a compressed air tank also blows air toward the sensor for cleaning, in one embodiment. The station 100 may include a bladder that blows air to clean a sensor when a mobile robot pushes against and compresses the bladder.

An ultrasonic cleaner removes dust or debris from a sensor by vibrating the sensor at an ultrasonic frequency, for instance between 20 and 400 kilohertz, in one embodiment. The ultrasonic cleaner may include piezoelectric transducers or any other type of actuator to generate ultrasonic vibrations.

The station 100 can provide commands to the cleaners 150 and 160 to clean sensors based on a duration of time, a number of tasks, or sensor data from the station 100. For example, the station 100 provides a time-based command to a cleaner to wipe, dispense cleaning solvent, or blow air for a certain duration of time such as one second, five seconds, ten seconds, etc. As another example, the station 100 provides a task-based command to a cleaner to wipe once, dispense a "pump" of cleaning solvent, or a blow "pump" of air. The station 100 may include sensors (not shown in FIG. 1A) that determine a level of cleanliness of a sensor of a mobile robot. For instance, the sensor of the station 100 is a camera that determines an amount of dust or debris accumulated on the sensor of the mobile robot. Based on the determine level of cleanliness, the station 100 can determine whether to start, continue, or stop cleaning the sensor of the mobile robot.

Though the embodiment of the station 100 shown in FIG. 1A includes two cleaners, in other embodiments, stations can include any number of cleaners. Further, the stations may not necessarily include a charging port 130 and power cord 140.

Figure 1B:
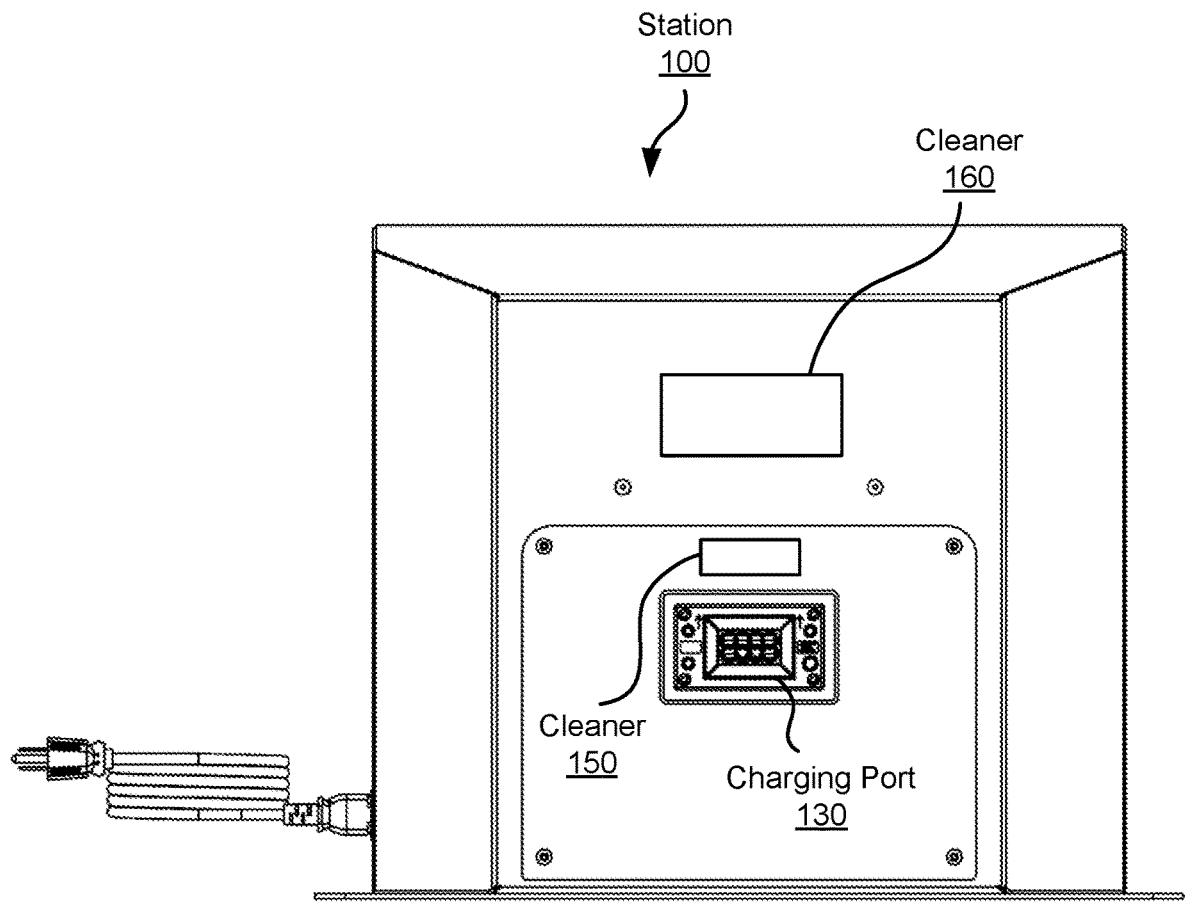
FIG. 1B is a front view of the station shown in FIG. 1A, according to one embodiment.
Figure 1C:
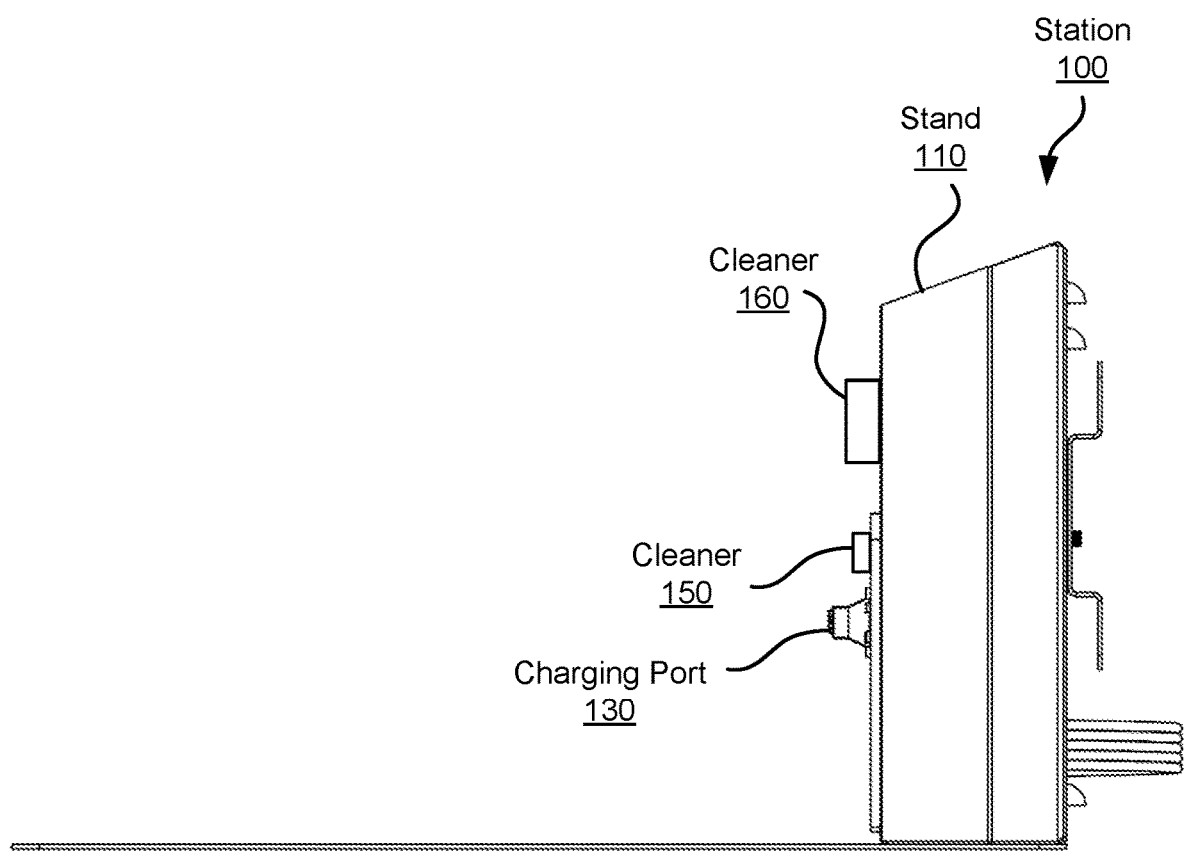
FIG. 1C is a side view of the station shown in FIG. 1A, according to one embodiment.
Figure 1D:
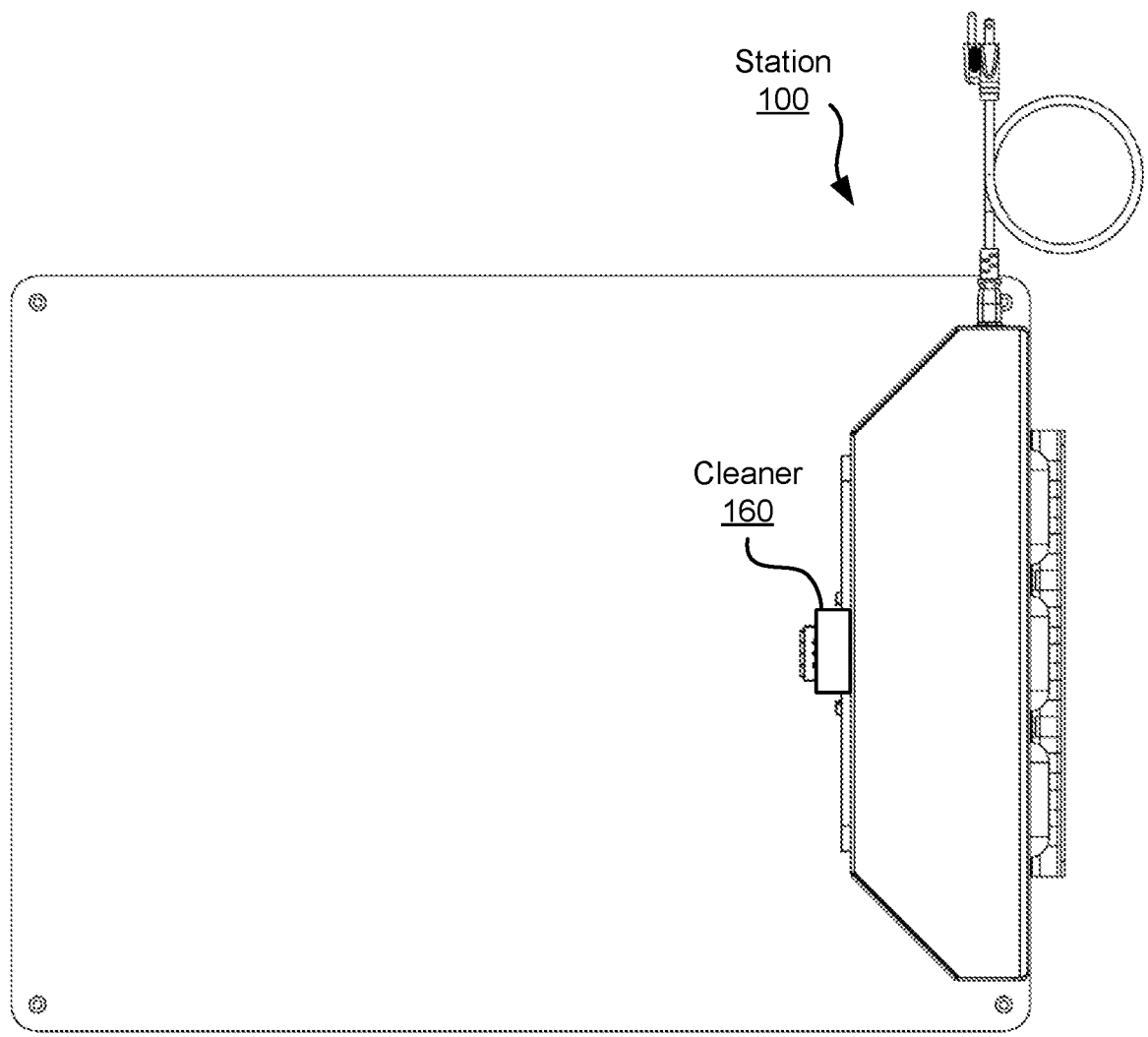
FIG. 1D is a top view of the station shown in FIG. 1A, according to one embodiment.

FIG. 1B is a front view of the station 100 shown in FIG. 1A, according to one embodiment. FIG. 1C is a side view of the station 100 shown in FIG. 1A, according to one embodiment. FIG. 1D is a top view of the station 100 shown in FIG. 1A, according to one embodiment. The cleaners 150 and 160 may be vertically aligned with the charging port 130. Further, the cleaners 150 and 160, as well as the charging port 130, may protrude from the face of the stand 110 to facilitate contact with a mobile robot at the station 100.

II. Functionality of Mobile Robots

Figure 2A:
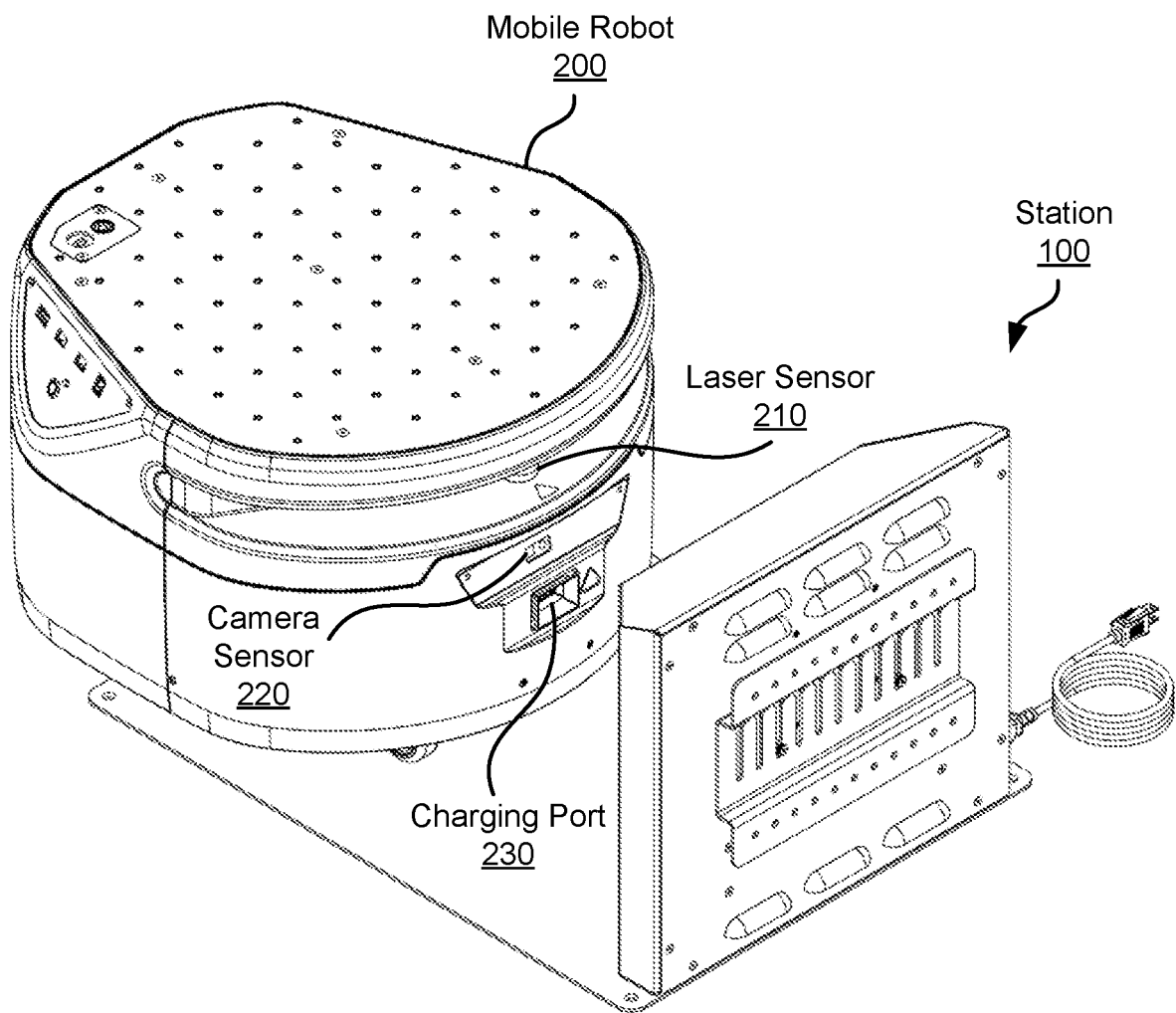
FIG. 2A is an isometric view of a mobile robot at the station shown in FIG. 1A, according to one embodiment.

FIG. 2A is an isometric view of a mobile robot 200 at the station 100 shown in FIG. 1A, according to one embodiment. The mobile robot 200 includes a laser sensor 210, camera sensor 220, and charging port 230. The laser sensor 210 may emit and receive infrared (IR) light to determine distances to objects in proximity to the mobile robot 200. The camera sensor 220 may capture visible light (or another light of a different section of the electromagnetic spectrum) to generate an image of the surroundings of the mobile robot 200. The mobile robot 200 can use data from its sensors to navigate in an environment, generate a map of portions of the environment, or modify an existing map of the environment. The navigation may be autonomous, human-guided, or a hybrid of the two types of navigation control. The mobile robot 200 may include any number of actuator-driven wheels (as well as non-actuated wheels such as casters) for mobility.

The mobile robot 200 includes a rechargeable battery (not shown in FIG. 2A) electrically coupled to the charging port 230. The mobile robot 200 can recharge its battery by electrically coupling the charging port 230 to the charging port 130 of the station 100.

Though the embodiment of the mobile robot 200 shown in FIG. 2A includes two sensors 210 and 220, in other embodiments, mobile robots can include any number of sensors. Additionally, mobile robots can include other types of sensors such as mechanical limit switches ("bumpers"), ultrasonic sensors, temperature sensors, chemical sensors, audio sensors, etc.

Figure 2B:
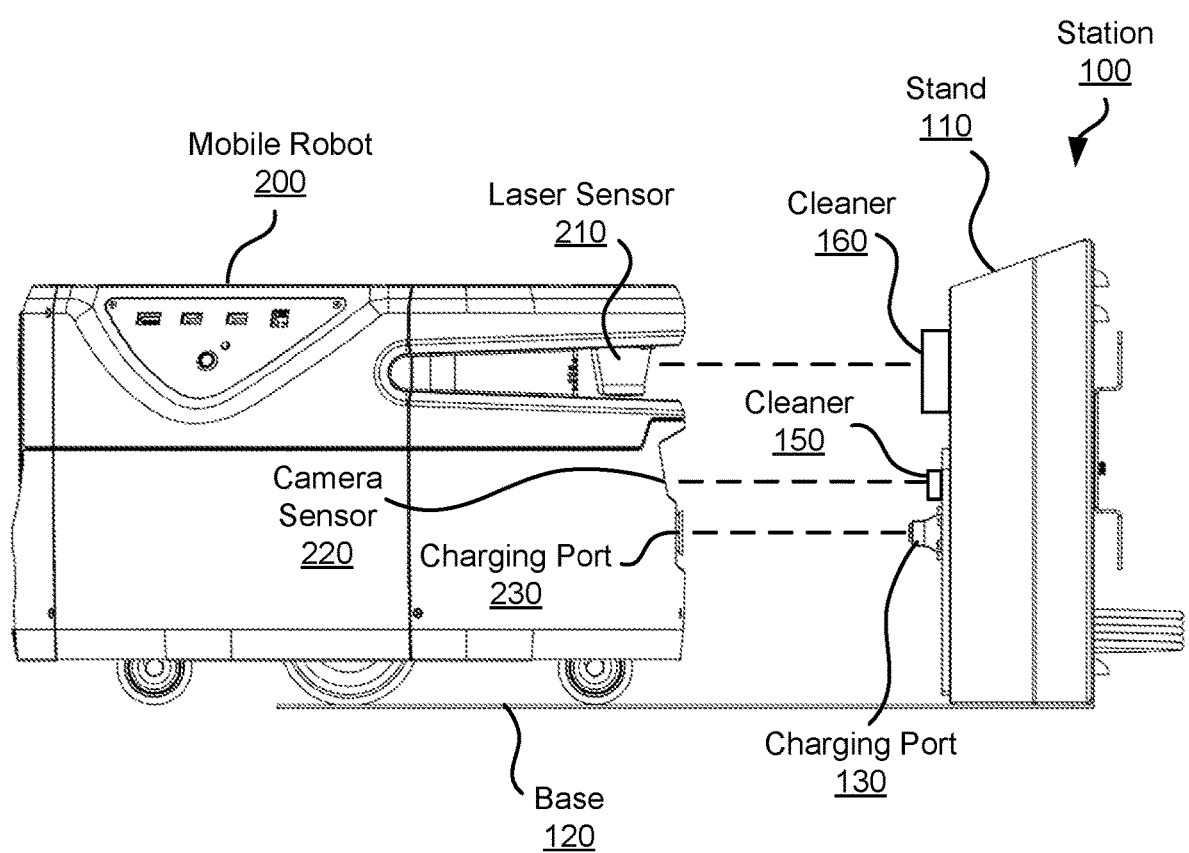
FIG. 2B is a side view of the mobile robot at the station shown in FIG. 2A, according to one embodiment.

FIG. 2B is a side view of the mobile robot 200 at the station 100 shown in FIG. 2A, according to one embodiment. The mobile robot 200 contacts the base 120 as the mobile robot 200 approaches the stand 110. As illustrated by the dotted lines, the charging port 230 of the mobile robot 200 is horizontally aligned with the charging port 130 of the station 100. In addition, the cleaner 150 is horizontally aligned with the camera sensor 220, and the cleaner 160 is horizontally aligned with the laser sensor 210. Thus, if the mobile robot 200 aligns to the station 100 for charging, the sensors 210 and 220 will also be automatically aligned to the cleaners 160 and 150, respectively. Accordingly, the station 100 may provide commands to the cleaners 160 and 150 to begin cleaning the sensors 210 and 220, respectively, in response to detecting that the charging port 230 of the mobile robot 200 is electrically coupled to the charging port 130 (or within range of the stand 110).

Figures 3A, 3B:
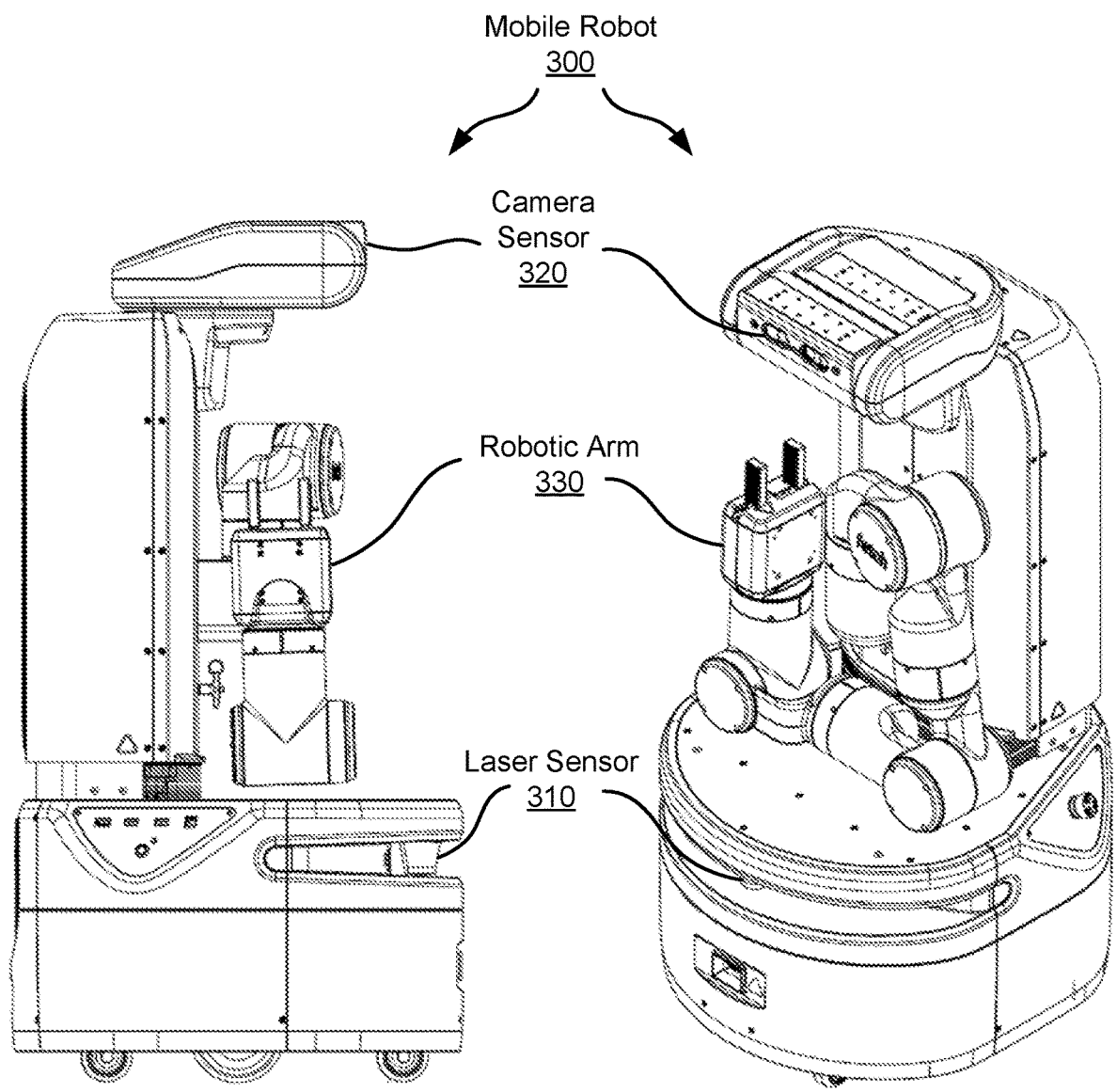
FIG. 3A is a side view of another mobile robot, according to one embodiment.
FIG. 3B is an isometric view of the mobile robot shown in FIG. 3A, according to one embodiment.

FIG. 3A is a side view of another mobile robot 300, according to one embodiment. FIG. 3B is an isometric view of the mobile robot 300 shown in FIG. 3A, according to one embodiment. The base of the mobile robot 300 is substantially the same as the mobile robot 200 described above with reference to FIGS. 2A-B. However, the mobile robot 300 includes an additional substructure coupled on top of the base. The substructure includes a robotic arm 330 which can extend and manipulate objects. For example, the robotic arm 330 picks and places inventory items and boxes in a warehouse. Similar to the mobile robot 200, the mobile robot 300 also includes a laser sensor 310 on the base. However, the camera sensor 320 of the mobile robot 300 is positioned at a greater height on the substructure rather than on the base.

III. Environment for Cleaning Sensors of Mobile Robots

Figure 4A:
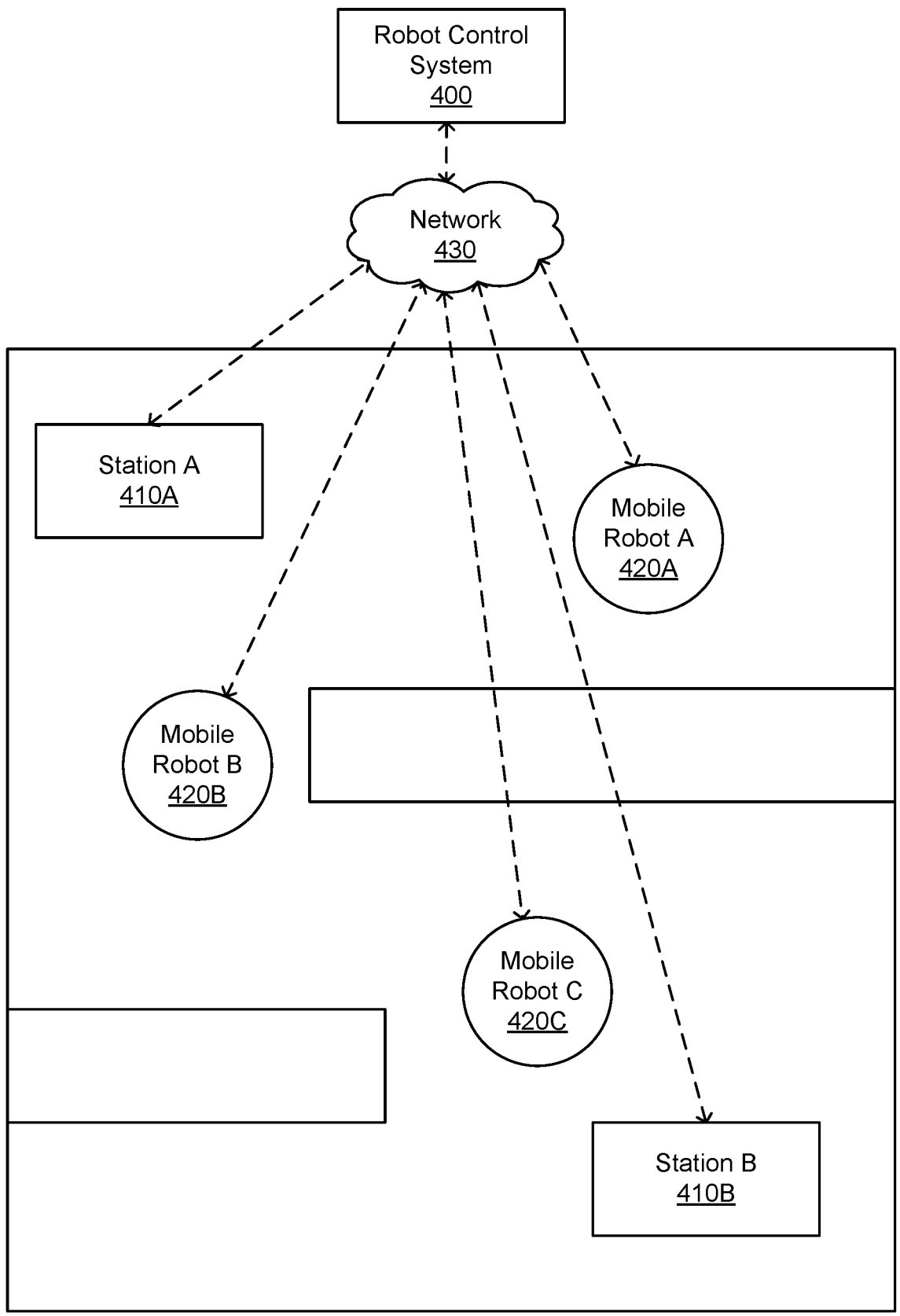
FIG. 4A is a diagram of a system environment with multiple mobile robots and stations, according to one embodiment.

FIG. 4A is a diagram of a system environment with multiple mobile robots and stations, according to one embodiment. The mobile robots and stations are connected to each other via a network 430, for example, the Internet. To serve as an illustrative example, the system environment includes three mobile robots 420A, 420B, and 420C, as well as two stations 410A and 410B. In other embodiments, the system environment may include any number of mobile robots and stations. In other embodiments, different and/or additional entities can be included in the system environment. The functions performed by the various entities of FIG. 4A may vary in different embodiments.

The system environment may be an inventory warehouse where the mobile robots navigate around obstacles and transport inventory items. Obstacles may include any physical object in the warehouse such as shelves holding inventory items, humans, and other mobile robots. The environment may also include non-physical obstacles such as keep-out zones, walkways for humans, or doorways. The mobile robots can assist a human to complete order fulfillment services. As an example use case, the human uses a client device to provide a command to a mobile robot to pick up an inventory item from a shelf. The mobile robot picks up the inventory item and places the item in a storage container of the mobile robot. The human may also manually pick up and place inventory items into the storage container. The mobile robot with the inventory item may follow the human to another location to pick up additional inventory items or to complete a different step of an order fulfillment service such as checkout or shipping. Alternatively, the mobile robot may lead the human by navigating autonomously or based on a predetermined route inside the warehouse.

Since the mobile robots consume battery power while navigating the warehouse or performing other functionality, the mobile robots may recharge their batteries at any available station with charging capability. The stations may be positioned at different locations inside the warehouse to decrease the average distance between a mobile robot and the closest station at any given time or location. Multiple stations may also be positioned adjacent to each other.

Each station may include a station controller to control functionality such as charging and cleaning sensors using the station's cleaners. Each mobile robot may include a robot controller to control functionality such as processing sensor data and navigating in the system environment. The station controller and robot controller are further described below.

In some embodiments, some or all functionality of the station controller or robot controller are performed on a robot control system 400. The robot control system 400 is a computer server including one or more processors wirelessly connected to the stations and mobile robots via the network 430. Performing functionality of the mobile robots on the robot control system 400 may reduce the computational resources required onboard the mobile robots, and thus extend the battery life of the mobile robots. Extending the battery life can be advantageous because the mobile robots may navigate the system environment for a greater duration of time and more efficiently by reducing the number of times they need to recharge at stations.

Additionally, the robot control system 400 may serve as a centralized hub that receives data from multiple mobile robots and stations in the system environment. Based on the received data and other information such as a map of the system environment, the robot control system 400 may coordinate functionality of the mobile robots. For example, the robot control system 400 identifies a given station nearby a mobile robot that needs charging and determines that no other mobile robot is also at the given station or navigating to the given station, to prevent a collision of mobile robots. The robot control system 400 may determine the shortest available path from the mobile robot to the given station and provide navigation commands to the mobile robot accordingly.

Figure 4B:
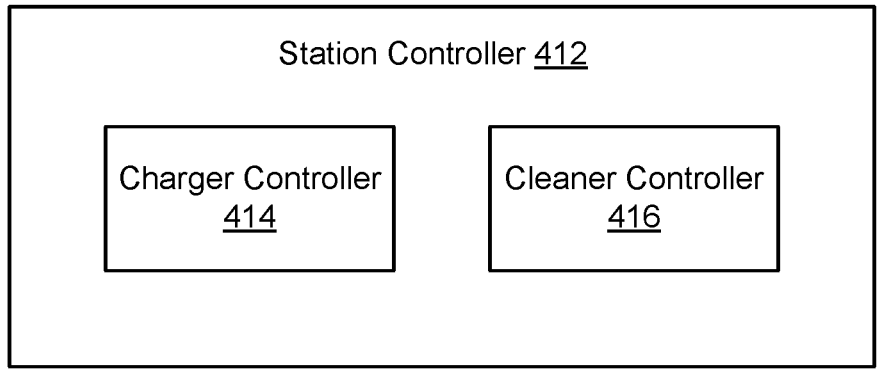
FIG. 4B is a block diagram of a station controller, according to one embodiment.

FIG. 4B is a block diagram of a station controller 412, according to one embodiment. The station controller 412 includes at least a charger controller 414 and a cleaner controller 416. Based on sensor data of the station 100, the charger controller 414 can determine that the charging port 130 of the station 100 is electrically coupled to the charging port 230 of the mobile robot 200. For example, the charger controller 414 determines if the charging port 130 has an open or closed circuit. As another example, the charger controller 414 uses data from a proximity sensor to determine if the mobile robot 200 is in range for wireless charging using an inductive charger. The charger controller 414 provides commands to charging mechanisms and electronics of a station 100 to start or stop charging of the battery of a mobile robot 200 at the station 100.

The cleaner controller 416 provides commands to cleaners of the station 100 to clean sensors of the mobile robot 200 at the station 100. The cleaner controller 416 may provide the commands in response to determining that the mobile robot 200 is located at the station 100 based on data from the charger controller 414. As previously described, the cleaner controller 416 may also determine a level of cleanliness of a sensor of the mobile robot 200 based on sensor data from the station 100 (or the mobile robot 200).

Figure 4C:
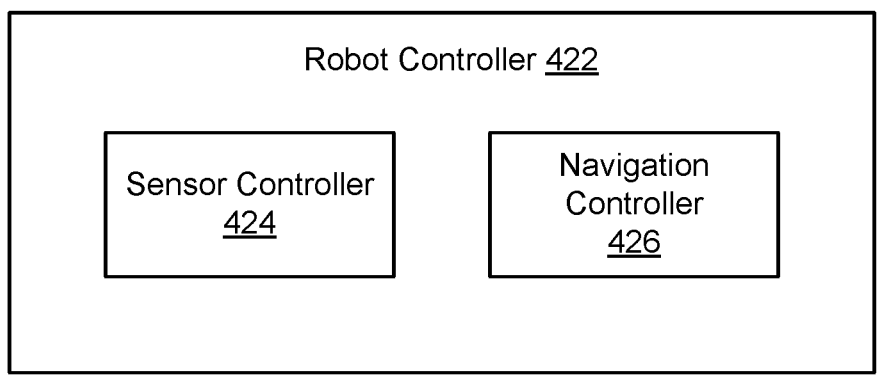
FIG. 4C is a block diagram of a robot controller, according to one embodiment.

FIG. 4C is a block diagram of a robot controller 422, according to one embodiment. The robot controller 422 includes at least a sensor controller 424 and a navigation controller 426. The sensor controller 424 processes data from the sensors of the mobile robot 200 such as the laser sensor 210 and the camera sensor 220. The sensor controller 424 may implement image processing techniques known to one skilled in the art, including algorithms for object detection, motion detection, facial or shape recognition, noise reduction, or image reconstruction. The sensor controller 424 may provide commands to the sensors to collect data based on a duty cycle to extend the battery life of the mobile robot 200. Thus, the sensor controller 424 may provide the commands less frequently when the mobile robot 200 has a low battery life.

The sensor controller 424 may also determine a level of cleanliness (or a "quality level") of a sensor based on data from the sensor. For example, the sensor controller 424 determines that the laser sensor 210 is generating data samples with a greater than expected variance of amplitude, which is indicative of a dirty laser sensor 210 and low quality data. As another example, the sensor controller 424 determines that the camera sensor 220 is capturing images with a lower than expected resolution, with obscured portions of the images, or with a smudge in a portion of the images, which are each indicative of a dirty camera sensor 220 and low quality data.

The navigation controller 426 provides commands to the mobile robot 200 to navigate around the system environment. The navigation controller 426 may generate the commands based on map information of the system environment. The map information may be pre-determined or generated in real-time using the data from sensors of the mobile robot 200 while navigating. The navigation controller 426 may implement mapping algorithms known to one skilled in the art such as simultaneous localization and mapping (SLAM), Voronoi diagram algorithms, and convex hull algorithms. Example SLAM algorithms are described in "Simultaneous Localisation and Mapping (SLAM): Part I The Essential Algorithms" by Hugh Durrant-Whyte and Tim Bailey published in the IEEE Robotics & Automation Magazine in 2006.

IV. Example Process Flows

FIG. 5 is a flowchart of an exemplary process 500 for cleaning a sensor of a mobile robot 200, according to one embodiment. The station controller 412 of a station 100 determines 510 that the mobile robot 200 is located at the station 100 (or "cleaning station"). The station controller 412 provides a command to the station 100 to clean 520 a sensor of the mobile robot 200 using one or more cleaners of the station 100. The station controller 412 may provide the command in response to determining that the sensor of the mobile robot 200 needs to be cleaned based on sensor data generated by the sensor. For example, the station controller 412 determines that a quality level of the sensor data is less than a threshold value.

The station controller 412 provides another command to charge 530 a battery of the mobile robot 200 simultaneously while cleaning the sensor. The station controller 412 determines 540 that the sensor is cleaned. In some embodiments, the station controller 412 provides information to the mobile robot 200 indicating that the sensor is cleaned. In response to receiving information, the mobile robot 200 navigates away from the cleaning station 100.

The station controller 412 determines 550 that the mobile robot 200 is no longer located at the cleaning station 100. Thus, the cleaning station 100 stops cleaning the sensor and/or charging the battery of the mobile robot 200. Some or all steps of the process 500 may be performed by the robot control system 400.

Figure 6:
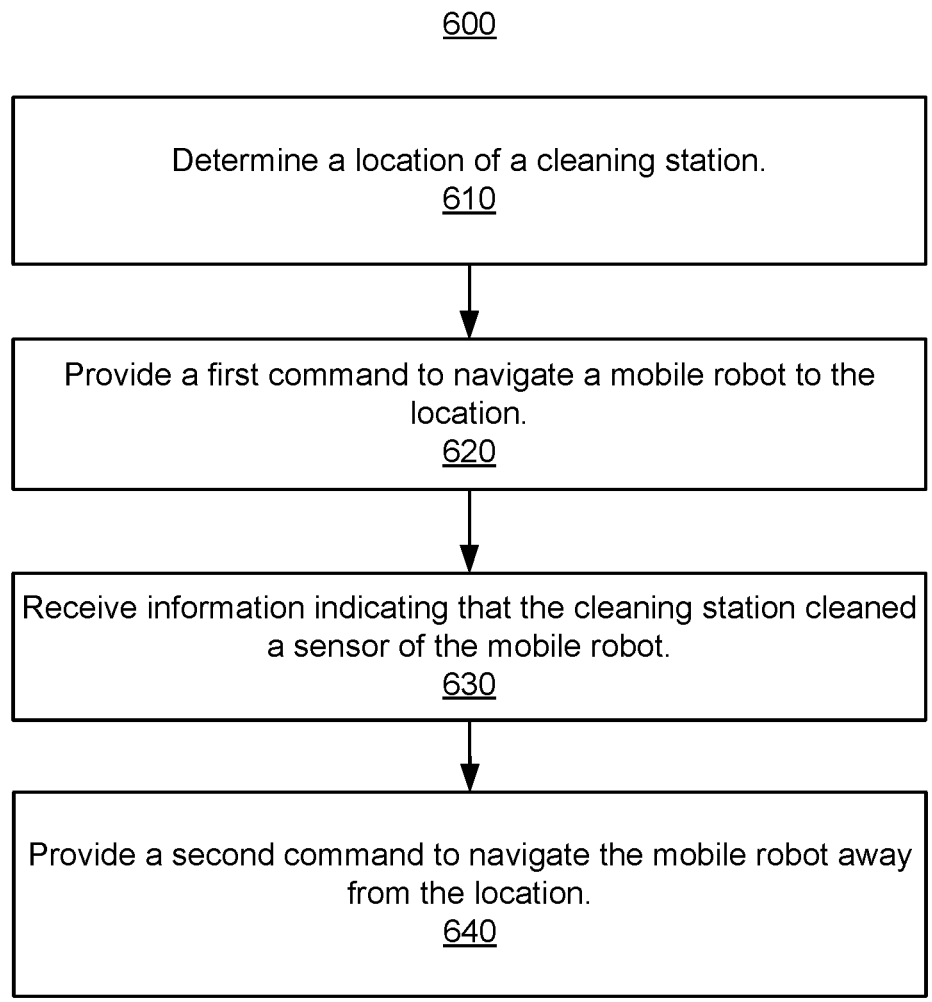
FIG. 6 is a flowchart of an exemplary process for navigating a mobile robot to a station for sensor cleaning, according to one embodiment.

FIG. 6 is a flowchart of an exemplary process 600 for navigating a mobile robot 200 to a station 100 for sensor cleaning, according to one embodiment. The robot controller 422 of a mobile robot 200 including one or more sensors determines 610 a location of the cleaning station 100. The robot controller 422 can determine how long it would take the mobile robot 200 to navigate to the location of the cleaning station 100. For example, the robot controller 422 may determine that the duration of time required to navigate to the location is less than another duration of time required to navigate to a different station. In addition, the robot controller 422 may ensure that multiple mobile robots do not interfere with each other's navigation. For example, the robot controller 422 determines that another mobile robot will not be located within a predetermined distance (such as a 1 meter or 5 meter radius) from the cleaning station 100 when the mobile robot 200 will navigate to the predetermined distance.

The robot controller 422 provides 620 a first command to navigate the mobile robot 200 to the location. The robot controller 422 may provide the first command in response to determining that a quality level of data from one of the sensors is below a threshold value, or in response to determining that the sensors of the mobile robot 200 have not been cleaned for a given duration of time such as the past hour or past day. Additionally, the robot controller 422 can determine opportunity-based scheduling of sensor cleaning to reduce idle time of the mobile robot 200. For example, the robot controller 422 provides the first command in response to determining that the mobile robot 200 currently does not have another command to perform such as navigating to pick up or drop off an inventory item. In some embodiments, the robot controller 422 provides the first command after the mobile robot 200 reaches a checkpoint location based on map information. The robot controller 422 may determine the checkpoint location based on a planned route of the mobile robot 200, as to reduce the amount of the distance and/or time required to detour from the planned route to navigate to the cleaning station 100.

The robot controller 422 receives 630 information indicating that the cleaning station 100 cleaned at least one of the sensors of the mobile robot 200. The information may be based on a predetermined period of time, data from sensors of the cleaning station 100 or the mobile robot 200, and/or an indicator identifying a completion of a cleaning cycle. The cleaning cycle may be based on a schedule for cleaning or based on events such as charging the battery of the mobile robot 200 to a threshold power level, receiving another command for the mobile robot 200 to perform, or receiving an indication that another mobile robot is navigating to the same cleaning station 100 for sensor cleaning or charging.

The robot controller 422 provides 640 a second command to navigate the mobile robot 200 away from the location after receiving the information. Thus, another mobile robot can navigate to the same cleaning station 100 for sensor cleaning or battery charging. Some or all steps of the process 600 may be performed by the robot control system 400.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A method comprising:
    determining a first location of a cleaning station;
    determining a quality level of sensor data generated by one or more sensors of a mobile robot, wherein the quality level is determined using a variance of amplitude of data samples of the sensor data;
    providing, responsive to determining that the quality level is below a threshold value, a first command to navigate the mobile robot to the first location;
    receiving information indicating that the cleaning station cleaned at least one of the one or more sensors; and
    providing a second command to navigate the mobile robot away from the first location after receiving the information.

2. The method of claim 1, wherein the one or more sensors includes a camera sensor, and wherein the quality level is determined further using a resolution of an image captured by the camera sensor.

3. The method of claim 1, wherein the information indicating that the cleaning station cleaned the at least one of the one or more sensors is based on at least one of: a predetermined period of time, sensor data captured by the one or more sensors of the mobile robot, sensor data captured by a cleaning sensor of the cleaning station, and an indicator identifying a completion of a cleaning cycle.

4. The method of claim 1, wherein the mobile robot is in a vicinity of a plurality of cleaning stations including at least the cleaning station and another cleaning station, and wherein the method further comprises:
    determining a first duration of time required for the mobile robot to navigate to the first location; and
    determining a second duration of time required for the mobile robot to navigate to a second location of the another cleaning station, the first duration of time less than the second duration of time.

5. The method of claim 1, further comprising:
    determining a time at which the mobile robot will navigate to a predetermined distance from the first location; and
    determining that another mobile robot will not be located within the predetermined distance from the first location at the time.

6. The method of claim 1, wherein providing the first command is in response to determining that the mobile robot does not currently have another command to perform.

7. The method of claim 1, wherein providing the first command is in response to determining that the mobile robot has not navigated to a cleaning station to clean the one or more sensors for a given duration of time.

8. A non-transitory computer readable storage medium having instructions encoded thereon that, when executed by a processor, cause the processor to:
  determine a first location of a cleaning station;
  determine a quality level of sensor data generated by one or more sensors of a mobile robot, wherein the quality level is determined using a variance of amplitude of data samples of the sensor data;
  provide, responsive to determining that the quality level is below a threshold value, a first command to navigate the mobile robot to the first location;
  receive information indicating that the cleaning station cleaned at least one of the one or more sensors; and
  provide a second command to navigate the mobile robot away from the first location after receiving the information.

9. The non-transitory computer readable storage medium of claim 8, wherein the information indicating that the cleaning station cleaned the at least one of the one or more sensors is based on at least one of: a predetermined period of time, sensor data captured by the one or more sensors of the mobile robot, sensor data captured by a cleaning sensor of the cleaning station, and an indicator identifying a completion of a cleaning cycle.

10. The non-transitory computer readable storage medium of claim 8, wherein the mobile robot is in a vicinity of a plurality of cleaning stations including at least the cleaning station and another cleaning station, and having further instructions that when executed by the one or more processors cause the one or more processors to:
  determine a first duration of time required for the mobile robot to navigate to the first location; and
  determine a second duration of time required for the mobile robot to navigate to a second location of the another cleaning station, the first duration of time less than the second duration of time.

11. The non-transitory computer readable storage medium of claim 8, having further instructions that when executed by the one or more processors cause the one or more processors to:
  determine a time at which the mobile robot will navigate to a predetermined distance from the first location; and
  determine that another mobile robot will not be located within the predetermined distance from the first location at the time.

12. The non-transitory computer readable storage medium of claim 8, wherein providing the first command is in response to determining that the mobile robot does not currently have another command to perform.

13. The non-transitory computer readable storage medium of claim 8, wherein providing the first command is in response to determining that the mobile robot has not navigated to a cleaning station to clean the one or more sensors for a given duration of time.

14. A method comprising:
  determining a first location of a cleaning station;
  determining a time at which a mobile robot will navigate to a predetermined distance from the first location;
  providing, responsive to determining that another mobile robot will not be located within the predetermined distance from the first location at the time, a first command to navigate the mobile robot to the first location, the mobile robot including one or more sensors;
  receiving information indicating that the cleaning station cleaned at least one of the one or more sensors; and
  providing a second command to navigate the mobile robot away from the first location after receiving the information.

15. The method of claim 14, wherein the information indicating that the cleaning station cleaned the at least one of the one or more sensors is based on at least one of: a predetermined period of time, sensor data captured by the one or more sensors of the mobile robot, sensor data captured by a cleaning sensor of the cleaning station, and an indicator identifying a completion of a cleaning cycle.

16. The method of claim 14, wherein providing the first command is in response to determining that the mobile robot does not currently have another command to perform.

17. The method of claim 14, wherein providing the first command is in response to determining that the mobile robot has not navigated to a cleaning station to clean the one or more sensors for a given duration of time.

* * * * *